July 10, 1945.  C. WILDER  2,380,093
DISPENSING MACHINE
Filed March 18, 1941  6 Sheets-Sheet 1
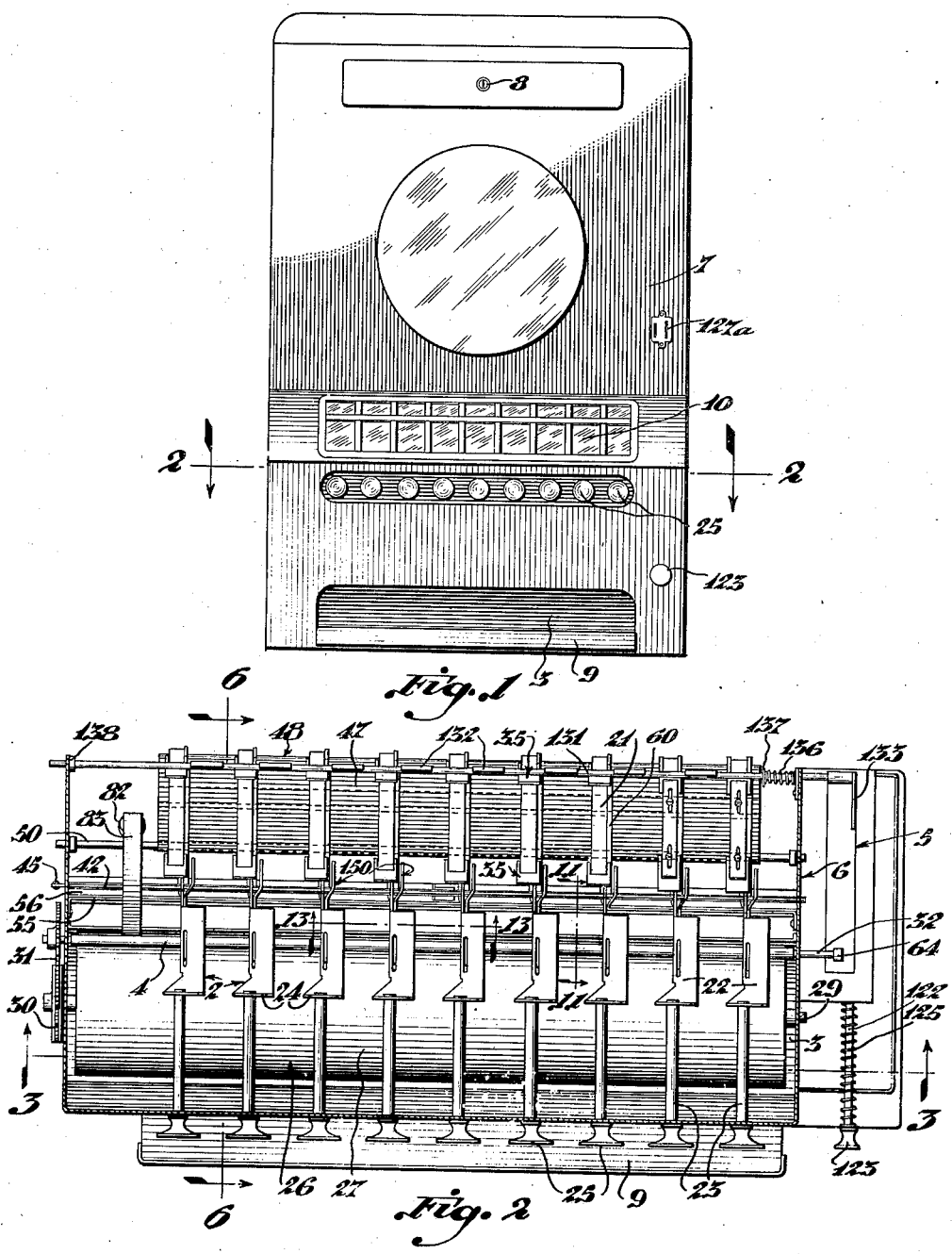
INVENTOR.
BY Charlton Wilder
Wood, Arey, Herron & Evans
ATTORNEYS July 10, 1945.　　　　C. WILDER　　　　2,380,093
DISPENSING MACHINE
Filed March 18, 1941　　　　6 Sheets-Sheet 2

INVENTOR.
BY Charlton Wilder
Wood, Arey, Herron & Evans
ATTORNEYS

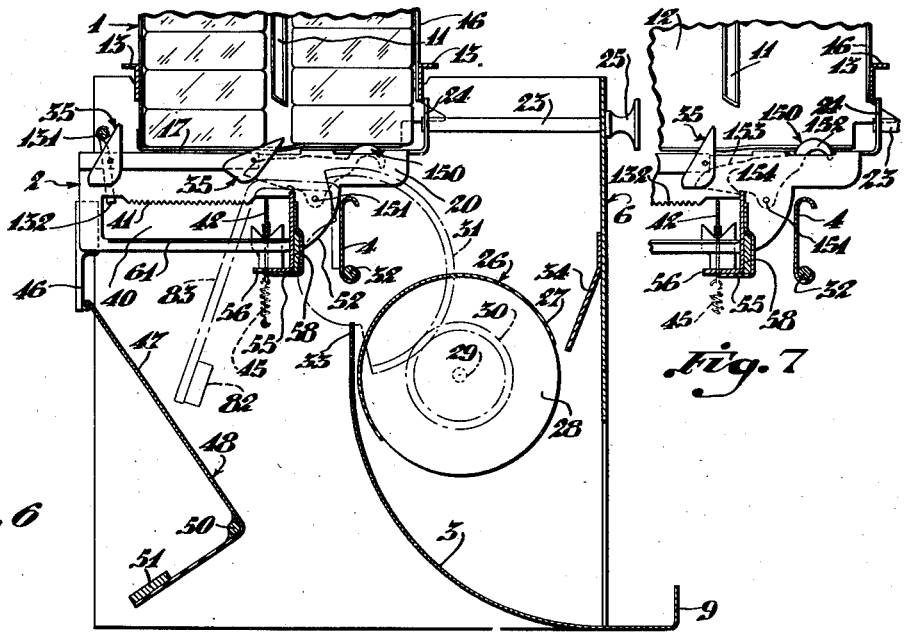
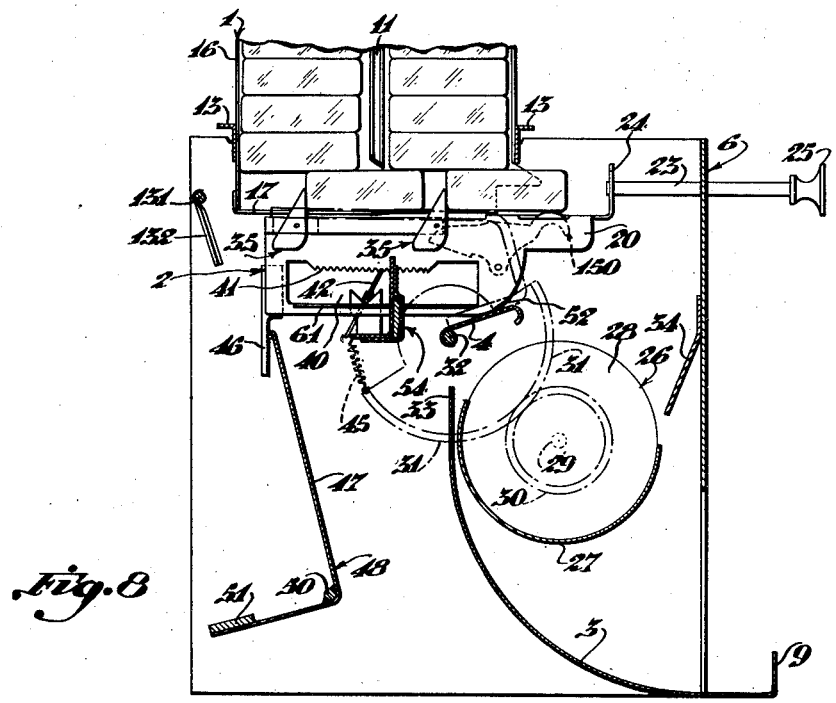

July 10, 1945.                C. WILDER                2,380,093
DISPENSING MACHINE
Filed March 18, 1941                6 Sheets-Sheet 4

INVENTOR.
Charlton Wilder
BY
Wood, Arey, Herron & Evans
ATTORNEYS

July 10, 1945.  C. WILDER  2,380,093
DISPENSING MACHINE
Filed March 18, 1941  6 Sheets-Sheet 5
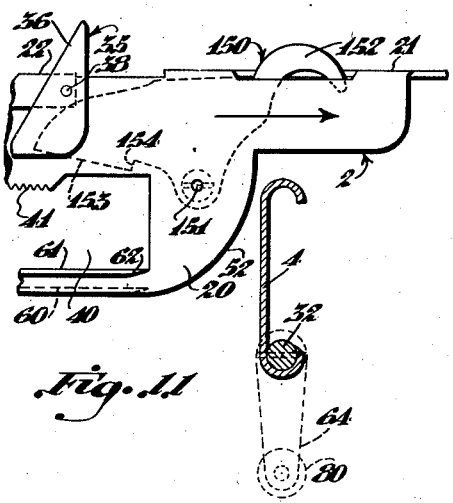
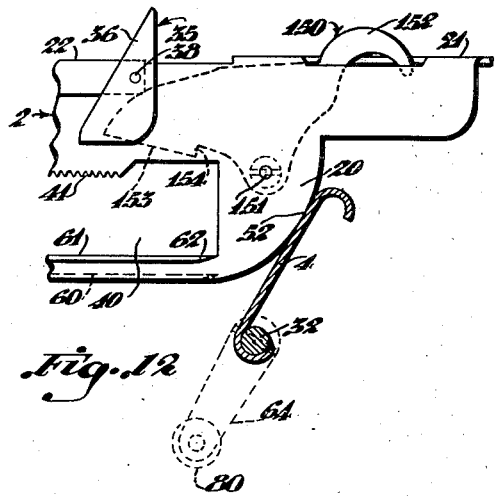
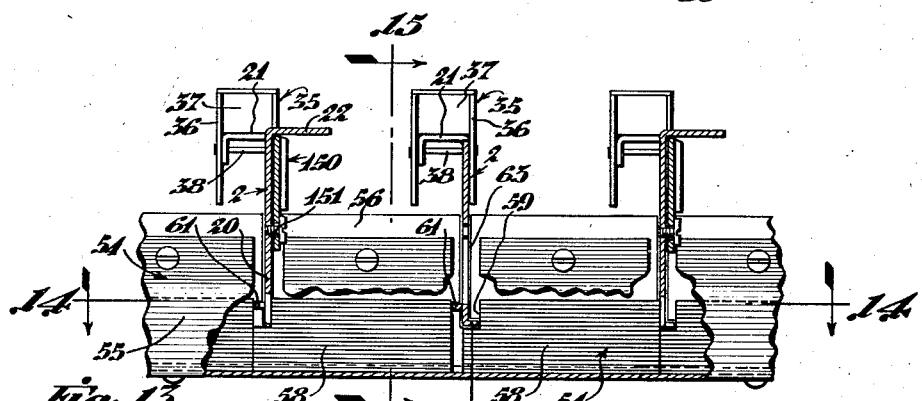
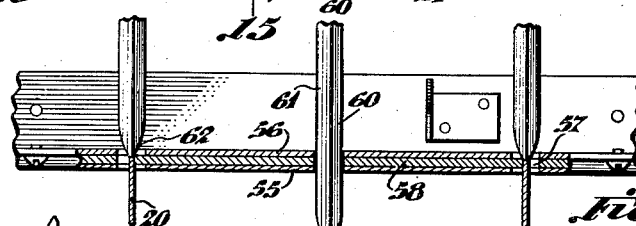
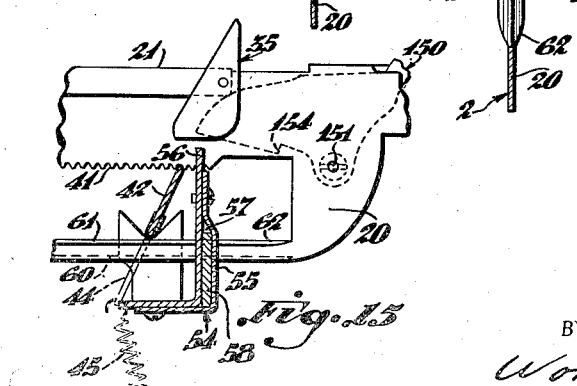
INVENTOR.
BY Charlton Wilder
Wood, Arey, Herron & Evans
ATTORNEY July 10, 1945.    C. WILDER    2,380,093
DISPENSING MACHINE
Filed March 18, 1941    6 Sheets-Sheet 6

INVENTOR.
Charlton Wilder
BY
Wood, Arey, Herron & Evans
ATTORNEYS

Patented July 10, 1945

2,380,093

UNITED STATES PATENT OFFICE 2,380,093

DISPENSING MACHINE

Charlton Wilder, Cincinnati, Ohio, assignor of fifty per cent to Albert Price, University City, Mo.

Application March 18, 1941, Serial No. 383,991

15 Claims. (Cl. 312—67)

This invention relates to vending machines of the type adapted to dispense merchandise upon insertion of coins or change.

The principal object of the present invention has been to provide an automatic machine which vends a plurality of different articles, such as packs of cigarettes of different brands, upon the insertion of coins totaling the requisite amount. While machines of this general type and purpose have been available in the past, the machines of the present invention differ therefrom in the simplicity of the cooperating parts of which they are comprised, the ease of assembling these parts, the limited number of parts, and the cost.

In addition to these features, an object of the invention has been to provide a plurality of magazines, for holding substantial supplies of merchandise of given kinds in stacks, and an ejecting mechanism which dispenses all of the articles in one of the stacks in advance of the others until its supply is exhausted.

A further object of the invention has been to provide an ejecting mechanism which is substantially unlimited as to the extent of its movement excepting by the external dimensions of the machine itself in order that articles of different type and shape may be vended from the respective magazines including articles of substantial length as well as those which are quite short.

Throughout the remainder of the specification, by way of example, a machine is disclosed which is particularly adapted for vending cigarettes though it will be understood that other articles may be dispensed and that the apparatus may be operated in conjunction with a coin release mechanism actuated upon coins of various denominations as required. One typical coin actuated release mechanism adapted particularly to be used in conjunction with the present machines is disclosed in my copending application, Serial No. 528,558 which is a division of this application.

Briefly, the machines of the present invention are comprised of a central chamber within which the series of supply magazines are located. These are arranged vertically in rows extending across the machine and each series or group is comprised of one or more magazines arranged one behind the other. The articles to be vended are stacked within the magazines and feed downwardly as they are ejected. The articles are fed from one magazine of a group until its supply is exhausted, then from the next magazine of the group and so on until no more articles are contained in any of the supply chambers of that group.

Beneath each group of magazines is an ejecting mechanism which, when it is withdrawn, has a member engaging the lower-most article of one of the magazines of the group. The package is expelled from the tiered supply to a delivery opening in the machine which is accessible to the purchaser. The ejection mechanisms are arranged so as to be unreturnable excepting after they have travelled through a full delivery stroke, and the ejection mechanisms, collectively, are intercontrolled so that the operation of any given one of them prevents the operation of all others. Mechanisms for these general purposes have been known in the art but the novelty in the present apparatus resides in the simplicity of the structure by which the desired results are accomplished.

To block the release of any of the dispensing mechanism until the proper value of coins has been inserted in the machines, there is a lock bar which extends across the mechanisms so as to obstruct their delivery operation. This lock bar in turn is released by the coin actuated control device. The lock bar is pivoted at its ends, and when released, it swings clear of all ejecting mechanisms and therefrom imposes no limitation upon the path of travel which they otherwise may have. This feature is particularly desirable in that it enables merchandise units of greater length to be dispensed than with the mechanisms heretofore available.

There are other features and advantages shown in the drawings and in the following description of them. From the foregoing disclosure of the principle of the invention, and the following disclosure of a typical embodiment of it, those skilled in the art readily will understand the modifications to which the present invention is susceptible.

In the drawings:

Figure 1 is a front view of a cabinet typical of the kind which may be utilized to house the dispensing mechanism of the present invention.

Figure 2 is a sectional view taken on line 2—2, Figure 1, looking down on the delivery carriages.

Figure 6 is a fragmentary sectional view taken on line 6—6, Figure 2, showing one of the delivery carriages and the delivery chute.

Figure 7 is a fragmentary view showing the lock trigger which locks the carriage when the column is empty.

Figures 8, 9 and 10 are views similar to Figure 6 and show the relative positions of the delivery mechanism in various stages for delivery a package.

Figures 11 and 12 are similar fragmentary views, taken on line 11—11 in Figure 2, showing two positions of one of the delivery carriages.

Figure 13 is a fragmentary sectional view taken on line 13—13, Figure 2, showing the interlock mechanism adapted to permit only one carriage to be withdrawn at a time.

Figure 14 is a cross sectional view taken on line 14—14, Figure 13.

Figure 15 is a cross sectional view taken on line 15—15, Figure 13, further illustrating the interlock.

Figure 3:
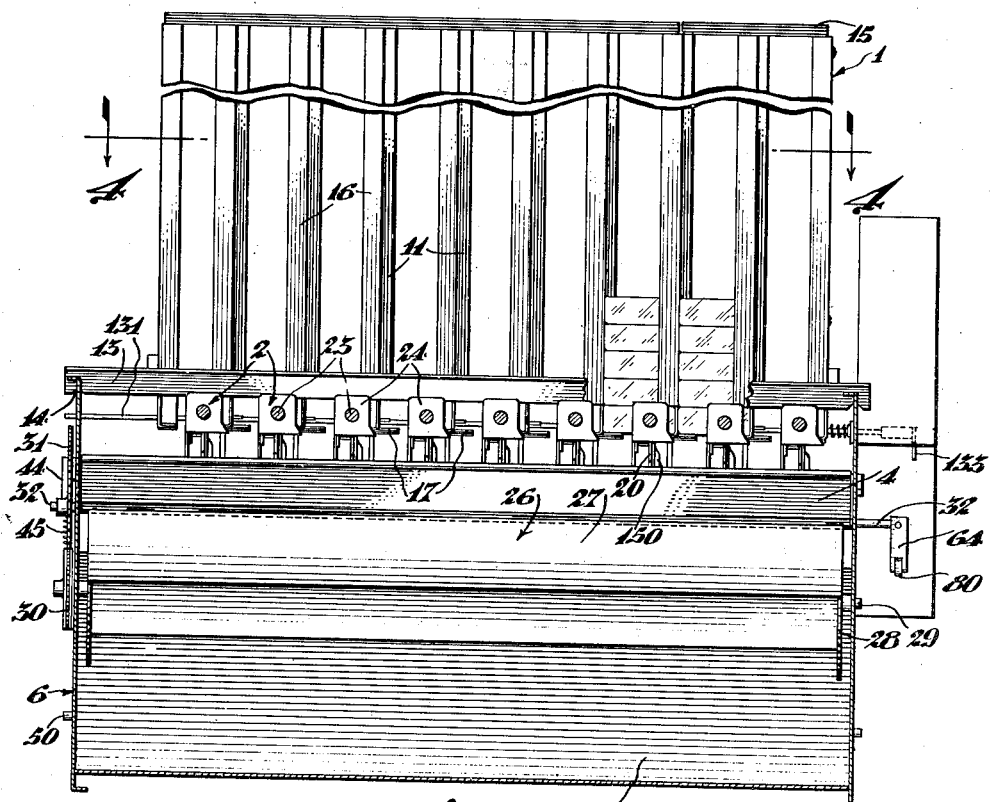
Figure 3 is a sectional view taken on line 3—3, Figure 2.

The dispensing machine comprises a plurality of storage magazines, indicated generally at 1; packages of cigarettes or the articles to be vended are stacked in these upon one another. The delivery carriages 2 are adapted to withdraw the packages from the storage magazines and carry them to a delivery chute 3. Lock bar 4 permits withdrawal of the carriages only when it is unlatched; and a coin operated latch 5 controls the lock bar. These are the principal mechanisms of the machine which cooperate with one another.

The machine is housed in a casing 6 which provides a unitary structure adapted to be installed in various types of cabinets. The casing is preferably formed from sheet metal, and the mounting framework for fastening the casing 6 in the cabinet is not shown here since it may be of any suitable type; for instance, brackets providing supporting shelves may be used or the unit may be spot welded or bolted to the walls of the cabinet.

The cabinet shown in Figure 1 is a table model and typical of the kind in which the machine may be installed. The front panel 7 of the cabinet is hinged (not shown) and swings open so that the dispensing mechanism and storage columns 1 are accessible for servicing. A standard lock, indicated at 8, may be provided for the panel 7. Near the base of the cabinet a delivery tray 9 is installed for delivering the dispensed packages to the purchaser. A row of windows 10, in the front of the cabinet, one for each column, which may include identifying labels for the brands of cigarettes carried in each column, provides sight openings through which the supply of cigarettes in the columns is visible.

Magazine storage

Each storage column contains two stacks of packages, one behind the other; these magazines are separated from one another by vertical ribs 11 extending outwardly from opposite side walls 12—12 in the columns. The vertical ribs 11 terminate short of the bottoms of the columns so that a passage for one package of cigarettes is provided from the rear to the front stack. The lowermost package in the front stack is withdrawn in each dispensing operation. In the present structure, as the front package is moved out, the lowermost package in the rear stack is moved forwardly to take its place; thus, the rear stack is exhausted first. The front stack of merchandise is visible through the windows 10 until both are exhausted.

Figure 5:
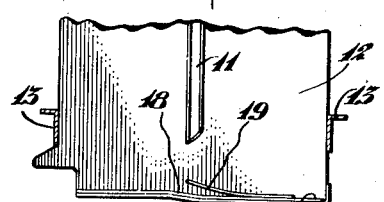
Figure 5 is a fragmentary sectional view taken on line 5—5, Figure 4, illustrating the manner in which the bottom of a storage column is constructed.
Figure 9:
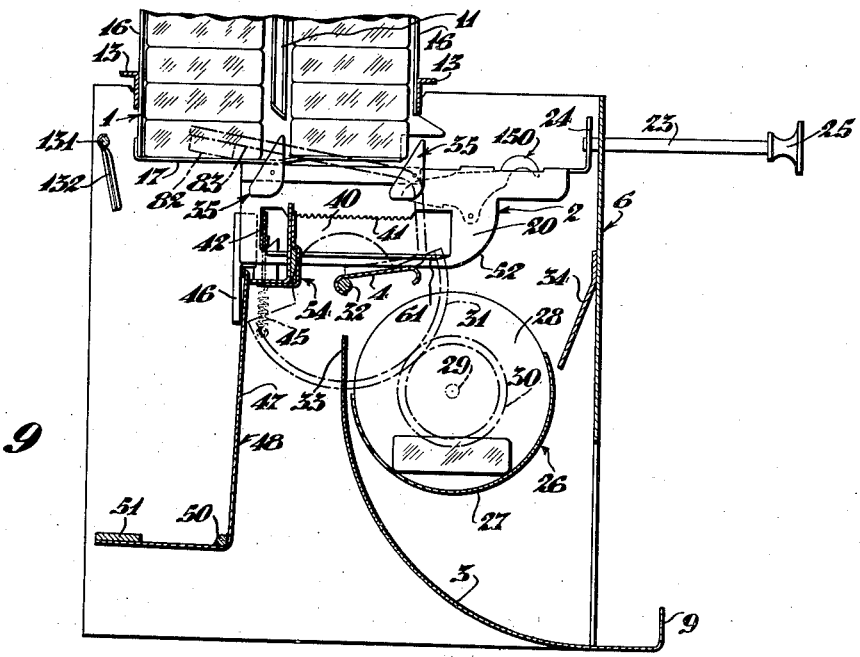
Figure 10:
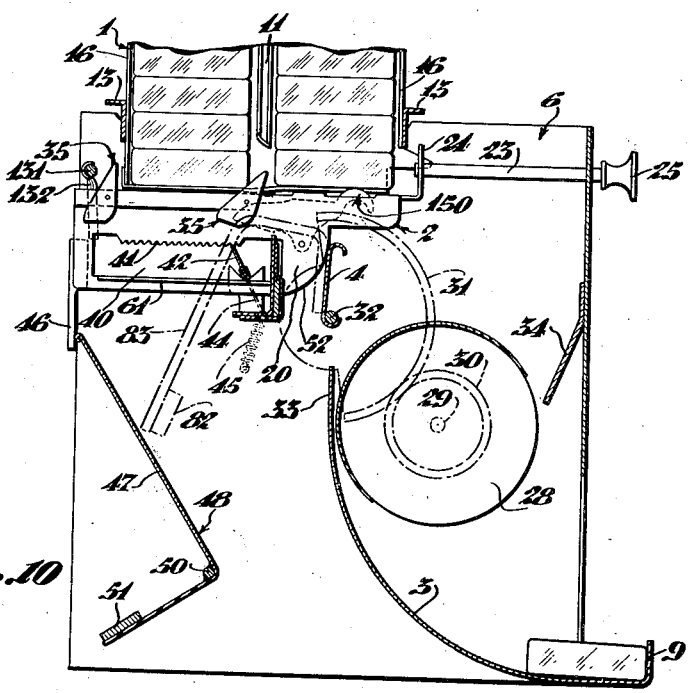

Preferably, the columns are removable as a unit for servicing. The assembly of columns is secured to a pair of longitudinal base bars 13—13 formed from angle iron. The bars 13 are notched near the ends, as at 14, and the upper edge of the end walls of the casing 6 are correspondingly notched to seat the column unit. Longitudinal angle iron bars 15—15 are also fixed along the tops of the columns to strengthen the structure. The side walls 12 which define the columns are formed from sheet metal and are turned over at their front and rear edges to provide guide flanges 16 for the stacks of packages. The stacks are supported at the bottoms of the columns on marginal guide plates 17 fixed to the lower edges of the division walls 12. Referring to Figure 5, it may be seen that the marginal guide plates are bent to form a ramp 18 rising slightly from the rear to the front. By this arrangement, the lowermost package of the rear stack can move under the second lowermost package in the front stack without catching and jamming during the dispensing operation. (See Figures 6 and 8.) A leaf spring 19 may be provided on the one guide plate 17 of each column to assist the upward movement of the package, and to prevent the package in the front column from being forced partially into the rear column.

Dispensing carriages

Figure 16:
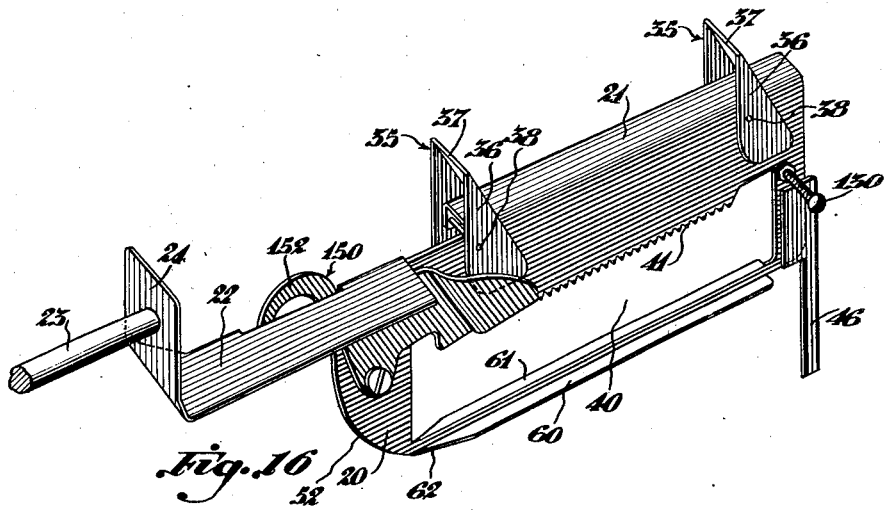
Figure 16 is a perspective view of one of the delivery carriages.
Figure 17:
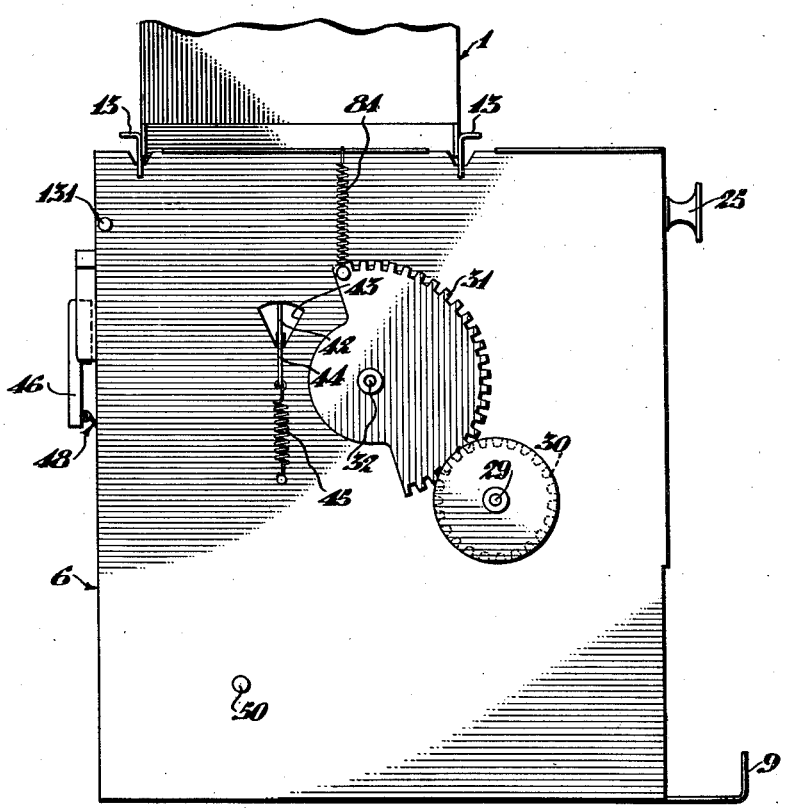
Figure 17 is an end view of the dispensing unit removed from the cabinet.

One of the delivery carriage assemblies is shown in Figure 16 to illustrate the details of the structure. The carriage is preferably formed from sheet metal and comprises a vertical body portion 20 and two horizontal tables 21 and 22. The rear table 21 is bent over at right angles to the body of the carriage and then down again to constitute an inverted channel. The forward table 22, a dispensing table, is bent over to the right at right angles to the body 20. The two tables are disposed respectively beneath the forward and rear storage columns. The rear table is utilized to support packages being conveyed from the rear stack to the forward stack while the forward table is utilized to support the packages being delivered to the tray at the front of the machine. The rear table 21 is disposed directly below the center of the rear stack, whereas the front table 22 is off-center toward one side so that as the packages are withdrawn and removed from the supporting guide plates 17 of the delivery columns, the packages of cigarettes, being unbalanced, fall from the front table 22.

While it will be seen that in the structure disclosed, the guide plates 17 serve to support the merchandise stacked in the columns, so that the pusher elements may overlie the table surfaces and still pass beneath the lowermost articles in the columns in the receding strokes, the guide plates may be omitted, if desirable, and recesses may be provided in the table surfaces for receiving the pushers during the receding movement.

The delivery carriage mechanisms are actuated by the purchaser through rods 23 fixed to upturned flanges 24 at the front of each carriage. The rods extend through appropriate openings at the front of the cabinet and carry knobs 25 so that they may be operated conveniently.

As a theft preventive measure, a revolving door 26 for the delivery tray 9 is utilized (Figures 6-10). The door comprises a trough or half cylinder 27 which extends the length of the casing. Two circular end walls 28 are provided, being welded or similarly fastened to the half round cylinder. Stub shafts 29 extending axially from the end walls of the trough are journalled in the end walls of the casing. At the left end to the outside of the casing, a gear 30 is pinned to the end of one of the stub shafts 29 (Figure 19). This gear 30 is in mesh with a gear segment 31 pinned to the left end of a rod 32 which is journalled in the side walls of the casing and carries the lock bar 4. The lock bar 4 is pivotally rotated, and consequently the rod 32 is also rotated, whenever a delivery carriage is withdrawn (discussed below). Therefore, the door 26 is rotatable in synchronism with the movement of the delivery carriages. As shown in Figure 6, when the delivery carriages are "in," the trough 27 provided by the half cylinder, faces downwardly. As a delivery carriage is withdrawn, the trough is revolved until it faces upwardly at the completion of the outward movement of the carriage. The package of cigarettes falls into the trough and the trough is again turned upside down, when the delivery carriage is returned, dumping the package on to the delivery tray. So that no one can reach up through the delivery tray opening around the revolving door, the delivery tray 9 is bent upwardly as at 33 to terminate behind and above the center of the trough. At the forward side of the door, a baffle plate 34 extends downwardly and rearwardly from the front wall of the casing to block the entrance around the front of the door.

From the foregoing description, it will be seen that delivery of the merchandise is accomplished by forward movement of the dispensing mechanism; and the arrangement of parts, particularly the arrangement of the revolving door, enables the apparatus to be considerably more compact than were delivery to be accomplished, as is usual in many devices, only after the dispensing mechanism has been pulled forward and then pushed backwardly.

Front and rear wedge-shaped pusher elements 35—35 are pivotally mounted on the conveyor table 21, one at the forward end and one at the rear. It may be seen by referring to Figure 8 that the forward pusher is adapted to abut the lowermost package of the forward stack and shove it forwardly when the carriage is withdrawn. The rear pusher, coincidentally, shoves the lowermost package of the rear stack forwardly to a position beneath the front stack. Each pusher comprises a pair of vertical arms 36 which are joined above the table by an abutment plate 37, and each pusher is pivoted transversely of the table axis on a pin 38 which passes through the two vertical arms 36 and the flanges of the inverted channel comprising the table 21. The pusher elements are counter-balanced so as to place the center of gravity behind the pivot 38. Therefore when free to move, the pushers assume the upright position in which they are shown. When in this upright position, the lower edge of the abutment plate 37 rests on the top of the table 21 so that the element cannot be swung backwardly. However, when the carriage is moving rearwardly from dispensing position, the two pushers are swung downwardly, upon engagement with the package of cigarettes, so that the abutment plate 37 lies flatly on the top of the table and out of the way of the packages. After the carriage is in its receded position, the pushers are clear of the packages and, therefore, swing up ready for the next dispensing operation.

Figure 4:
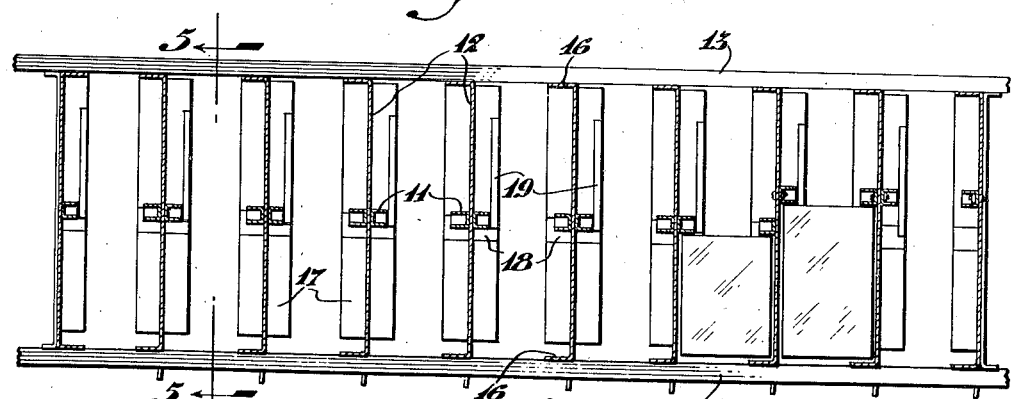
Figure 4 is a sectional view taken on line 4—4, Figure 3, showing the arrangement of the storage columns.

It will be noted in Figure 4 that the two storage columns at the right end are adapted for longer packages of merchandise than that stored in the other columns; for instance, "king size" cigarettes. In this instance, the vertical ribs 11 are disposed rearwardly of the center of the column and only one stack is carried in a column. The delivery carriage beneath these two deep stacks has only one pusher element adapted to engage behind the lowermost package. If it is desired, two stacks of such long packages may be carried in one column by making the column of appropriate dimensions.

*Full stroke mechanism*

The body portion 20 of each delivery carriage is cut out as at 40, and the upper edge of each opening thus provided is toothed to provide a rack 41. The rack terminates inwardly of the opening at both of its ends, and the two end portions of the opening are cut out above the rack level to leave clearance spaces.

Rack bar 42 extends longitudinally of the casing through the openings 40 in the body portions of the carriages, and it is cradled in V-shaped openings 43 in the two side walls of the casing, as shown in Figure 19. At the outer side of the walls of the casing, arms 44 extend downwardly from the ends of the bar 42 and carry tension springs 45; the lower end of each spring 45 is fastened to the wall of the casing below the V-shaped cradle openings 43 and the spring 45 thus operates to urge the bar toward an upright position.

The rack bar 42 constitutes a pawl for all the racks of the carriages, its upper edge being just above the level of the rack teeth of the carriages. When a delivery carriage is withdrawn or returned, the rack is dragged over the edge of the bar. The bar swings with the rack 41 in the direction of its path of travel. Any reversal of rack movement, excepting at the end of its stroke, causes the bar to act as a pawl preventing movement since it cannot swing backwardly. At either end of a stroke the bar is free to swing through the clearance way at the rack ends and therefore no pawl action can take place at these localities. This assembly makes it necessary for the operator to pull the carriage to the limit of its travel before it can be returned to receive another package of cigarettes.

*Carriage return*

At the rear end of each carriage, a finger 46 extends downwardly and is engaged by the upright arm 47 of a bell crank 48. The bell crank is in the form of an angle plate that extends the whole width of the machine and is common to all carriages. The bell crank 48 is pivoted on a longitudinal rod 50, journalled in the two side walls of the casing. The other arm of the bell crank extends rearwardly and is weighted as at 51. Therefore, when the carriage is withdrawn, the upright arm of the bell crank, being engaged at its upper end by the finger 46, is swung forwardly. When the carriage is released, the weight 51 acts to return the carriage to its inward position.

*Carriage lock mechanism*

The forward edge of the vertical portion of each carriage is rounded as at 52 to provide a cam, and lock bar 4 is disposed in front of the carriages and is engageable by the cam 52 on the front of the carriages. The lock bar 4 is rotatable about its longitudinal axis and acts as a gate, being mounted on the rod 32 which is journalled in the two side walls of the casing. The rod 32 extends across the machine below the level of the dispensing carriages with the lock bar 4 extending upwardly from it into the path of the carriages. When the bar is locked against pivotal rotation, it blocks the withdrawal of the carriages. When unlocked, it is free to be rotated and swung out of the way by engagement of the cam 52, thus, permitting withdrawal of a carriage.

The lock bar is controlled by the coin-operated latching mechanism 5. The coin lock is situated at the right end of the lock bar and is fixed to the outer wall of the casing, being adapted to release the lock bar only when the necessary number of coins has been inserted into the machine.

Single carriage release control

So that only one delivery carriage may be withdrawn at a time, an interlock mechanism, indicated generally at 54, is provided. This interlock comprises a pair of longitudinal angle bars 55—56 which are seated one within the other and configurated to form a longitudinal channel 57 between them. The angle bars may be bolted or welded together and they are fixed to the side walls of the casing by bolts passing through flanges turned from the ends thereof. In this channel, a series of lock plates 58 is slidably mounted.

Each one of these lock plates 58 is cut out as at 59 in the upper left-hand corners. The lower edge of each carriage; that is, the part constituting the margin of the opening 40, carries two lateral fins 60 and 61. These fins are bent over from the lower marginal edge of the carriage and extend from opposite sides at right angles thereto. The forward end of each fin is cut angularly to provide a wedge 62. The vertical body portion 20 of each delivery carriage is slidable in a slot 63 through the pair of longitudinal angle bars 55—56. This slot and the opening in the front of the casing, through which the actuating rod 23 extends, comprise the supporting means for the carriages.

Referring to Figures 13 and 14, it may be seen that the body portion of each carriage, forwardly of the fins 60 and 61, extends through the longitudinal channel 57 and the cut-out portions in the lock plates 58. When a carriage is in its inward position, the fins lie behind the lock plates. The cumulative clearance between the lock plates 58 is equal to the span of the fins 60—61 on one carriage. Therefore, when one of the carriages is moved forwardly, the wedges 62 on the fins force the plates sidewisely in the channel permitting only one carriage to be withdrawn while locking all of the others against forward movement.

The lock bar 4 is released so as to be free to swing when the proper number of coins is inserted in the latching mechanism 5. In Figures 11 and 12, a swinging arm 64, shown in dotted lines, is pinned to the lock bar rod 32. The arm is fixed on the right end of the rod 32 on the outside of the casing (Figure 3) where it is coupled in the latch 5. When the latch 5 is locked, the arm 64 of the lock bar is held against movement and consequently the carriages are all held against withdrawal.

When the last package of cigarettes is dispensed from any one of the forward stacks in the columns, a lock-out trigger 150 acts to lock the particular carriage against any further withdrawals. The trigger is pivoted to the vertical body 20 of the carriage at 151. The trigger comprises a head 152 which is disposed beneath the forward stack, a tail piece 153 which is weighted sufficiently to overbalance the head 152, and a catch 154 cut in the lower edge of the tail piece. Normally, the head is held down by the packages in the front stack, but, when the last package is dispensed, the head 152, being counterbalanced, swings up and the tail piece 153 drops so that the catch 154 engages the top edge of the angle bar 56 (Figure 7) holding the particular carriage against withdrawal.

Having described my invention, I claim:

1. A vending machine comprising a storage chamber adapted to hold a stack of packages of merchandise, table means located beneath said storage chamber for supporting articles during conveyance therefrom; said table means being offset with respect to the articles located in said storage chamber and being slidable across the bottom of the storage chamber, said table means including a member to effect withdrawal of the lowermost of the stacked articles therefrom, upon slidable operation thereof, the offset of the table being arranged with respect to the articles supported in the storage chamber in such manner that an article ejected from the storage chamber is supported by the table only in unbalanced relationship and tips from the table for discharge thereof.

2. A vending machine comprising a magazine for holding a stack of articles of merchandise, a dispensing mechanism located beneath the magazine and comprising a slidable table, means for moving the table past the magazine, means for conveying the lowermost of a stacked series of articles upon the table as the table moves beyond the magazine, the said table being offset with respect to the stack of articles in the magazine so that an article moved from the magazine is supported in unbalanced position upon the table and falls from the table when it escapes the confines of the magazine.

3. A vending machine comprising a magazine for holding a stack of articles of merchandise, a dispensing mechanism located beneath the magazine for dispensing articles of the stack, said dispensing mechanism comprising a slidable table member, a web depending from the table member, means for moving the table member past the magazine, means for conveying the lowermost article of the stack upon the table as it moves beyond the magazine, the said web containing an elongated aperture to provide rack configurations provided in a longitudinal edge of said aperture, and pawl means residing within the aperture and operative to prevent reversal of the movement of the table until the table has completed its full course of travel.

4. A vending machine comprising a plurality of magazines arranged in a row, each adapted to contain a stack of articles of merchandise, dispensing mechanism disposed beneath the magazines and having table means for supporting articles of merchandise, means for moving the tables across the bottoms of the magazines, means for conveying articles of merchandise from the magazines upon the table means as each table is moved beyond one of the magazines, rack means carried by the dispensing mechanisms, and a continuous pawl member extending along the row of dispensing mechanisms for engagement with said rack means, the pawl being arranged to prevent reversal of movement of any dispensing mechanism until that table has completed its full course of travel in a given direction.

5. In a vending machine the combination which comprises a plurality of vertically extending magazines arranged in a row, dispensing mechanisms arranged beneath the magazines, the said magazines having members adapted to support stacks of articles in the respective magazines, and a lock bar arranged to extend across all of the dispensing mechanisms so as to obstruct the operation of any dispensing mechanisms until the lock bar is released, the said lock bar being pivoted so as to swing out of the way of the dispensing mechanisms when it is released.

6. In a vending machine the combination of a plurality of slidable dispensing mechanisms arranged in a row, and a lock bar extending across the row of dispensing mechanisms so as to obstruct slidable operation of them until the lock bar is released, the lock bar being pivotally mounted to permit it to swing to a position clear of the dispensing mechanisms upon release thereof, each dispensing mechanism comprising a slidable table, a pair of pushers mounted on the table in spaced relationship, and means constituting a pair of magazines arranged over the table and respectively forwardly of the said pusher means, the said rearmost pusher being adapted to advance the lowermost articles stacked in the rearmost magazine to a position beneath the forward magazine, and the forward pusher being adapted to advance the lowermost of stacked articles forwardly of it to dispensing position.

7. In a vending machine the combination which comprises table means slidable in a horizontal direction, pusher elements normally extending laterally from said table to advance articles in the machine when said pusher elements are slid in one direction, said pusher elements being pivotally mounted to substantially overlie said table means when the table means is slid in a reverse direction, magazines arranged in spaced relationship above said table means and respectively forwardly of said pusher elements, said magazines each being adapted to contain a stack of articles to be vented, and means carried by one of the magazines for preventing sliding of said table when the entire supply of articles in both magazines is exhausted.

8. In a vending machine the combination which comprises table means slidable in a horizontal direction, pushed elements normally extending laterally from said table to advance articles in the machine when said pusher elements are slid in one direction, said pusher elements being pivotally mounted to substantially overlie said table means when the table means is slid in a reverse direction, magazines arranged in spaced relationship above said table means and respectively forwardly of said pusher elements, said magazines each being adapted to contain a stack of articles to be vended.

9. A dispensing device comprising a column magazine, a dispensing mechanism located beneath the magazine including a member which is slidable to push the lowermost of a series of articles stacked in the magazine beyond the magazine, a delivery chute adapted to receive articles ejected from the column by the dispensing mechanism, a rotatable door located in said delivery chute, and means interconnecting the dispensing mechanism with the rotatable door for opening the delivery door only after an article has been ejected from said magazine by said ejecting mechanism.

10. A dispensing device comprising a magazine for holding a plurality of articles, a slidable dispensing mechanism for ejecting articles, one at a time, from said magazine, and means for returning said dispensing mechanism after it has ejected an article comprising an angle plate pivotally mounted and having one portion constituting a counterweight and having another portion engaging said dispensing mechanism to return the same by exerting a force thereon through said counterweight.

11. A dispensing machine which comprises a plurality of columns arranged in a row, each column being adapted to receive a stack of merchandise, slidable dispensing mechanisms located beneath the respective columns for ejecting merchandise therefrom when the ejecting mechanisms are slid in one direction, and means for returning said ejection mechanisms in a reverse direction comprising an angle plate extending in a direction along the row of columns, said angle plate being axially pivoted and having one portion thereof constituting a counterweight and another portion thereof common to said dispensing mechanisms for urging said dispensing mechanisms to return positions through the action of said counterweight.

12. A dispensing machine comprising a plurality of columns arranged in a row, each column having side members bent inwardly at its lower portion to provide flanges for marginally supporting articles stacked in said columns, and slidable dispensing mechanism arranged beneath the column, each dispensing mechanism comprising a pivotally mounted pusher device for pushin the lowermost article of merchandise from each column when the said ejecting mechanism is slidably operated, and a table arranged beneath the said column flanges, with said pusher device being arranged to overlie said table and underlie the article carried by said flanges when the ejecting mechanism is returned.

13. A dispensing machine comprising a plurality of magazines arranged in a row, each for containing a plurality of articles of merchandise to be dispensed, slidable dispensing mechanisms adapted to be slidably operated to eject merchandise from said magazines, and means for preventing the dispensing mechanisms from being slidably moved in one direction until they have been moved to the extremity of their slidable strike in the other direction, said means comprising racks carried by each of the dispensing mechanisms in a common plane, and a rack bar which is common to all of the racks, and means for pivotally supporting said rack bar, said racks having clearance portions at their ends through which said rack bar may swing upon reversal after said dispensing mechanisms have been moved to the extremity of their stroke in either direction.

14. A dispensing machine comprising a plurality of columns arranged in a row, slidable dispensing mechanisms arranged beneath each of the columns, each dispensing mechanism comprising a table portion, means for ejecting articles from the columns when the dispensing mechanisms are slidably operated, web means depending from said tables, each web means presenting a cam surface, and a lock bar extending in a direction along the row of columns adjacent the cam surfaces of the web means, said lock bar being axially pivoted and normally being locked to prevent slidable operation of any of said dispensing mechanisms but capable of being rotated, when released, by the cam surfaces of said webs.

15. A dispensing mechanism comprising a plurality of pairs of columns arranged in a row, the columns of each row being arranged one behind the other, slidable dispensing mechanism, one for each pair of columns, arranged beneath the columns, pusher elements carried by said dispensing mechanism, one pusher element being located behind the rearmost column and another pusher element being located behind the foremost column, the said pusher elements being adapted to push articles of merchandise contained within said columns from the columns when the dispensing mechanism is slidably operated, a chute located generally forwardly and below the foremost columns of the row, a rotatable door extending along the row of columns in the chute, the said door, when closed, constituting a trough adapted to receive an article of merchandise ejected from one of said columns, and means for rotating the door to overturn the trough and cause the article of merchandise therein to spill into said chute upon return stroke of the dispensing mechanism which delivered the article into the trough.

CHARLTON WILDER.